Figure 1:
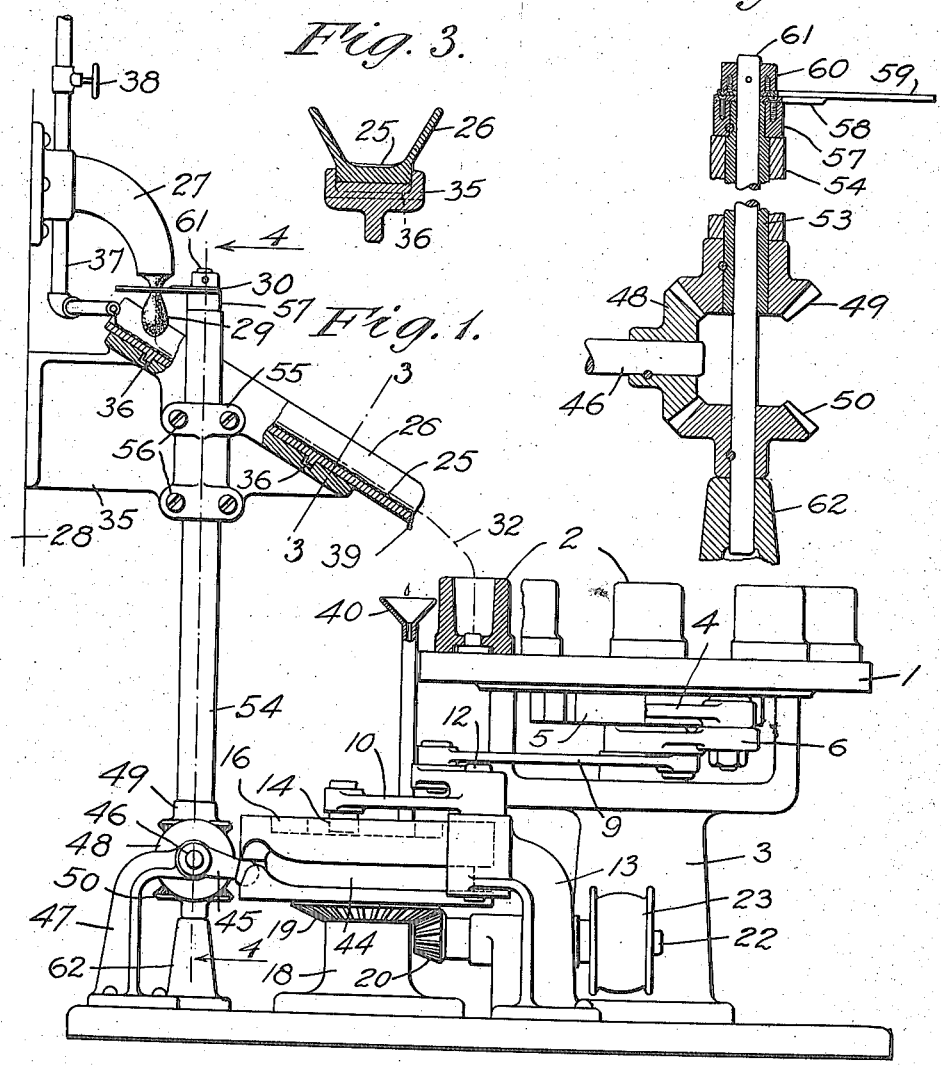

K. E. PEILER.
APPARATUS FOR CONVEYING MOLTEN GLASS.
APPLICATION FILED JUNE 24, 1912. RENEWED JAN. 3, 1916.

1,264,328.

Patented Apr. 30, 1918.
4 SHEETS—SHEET 2.

Witnesses:
Poul J Rasmussen
S. S. Grotta

Inventor:
Karl E. Peiler
by Wm H Honiss, Atty

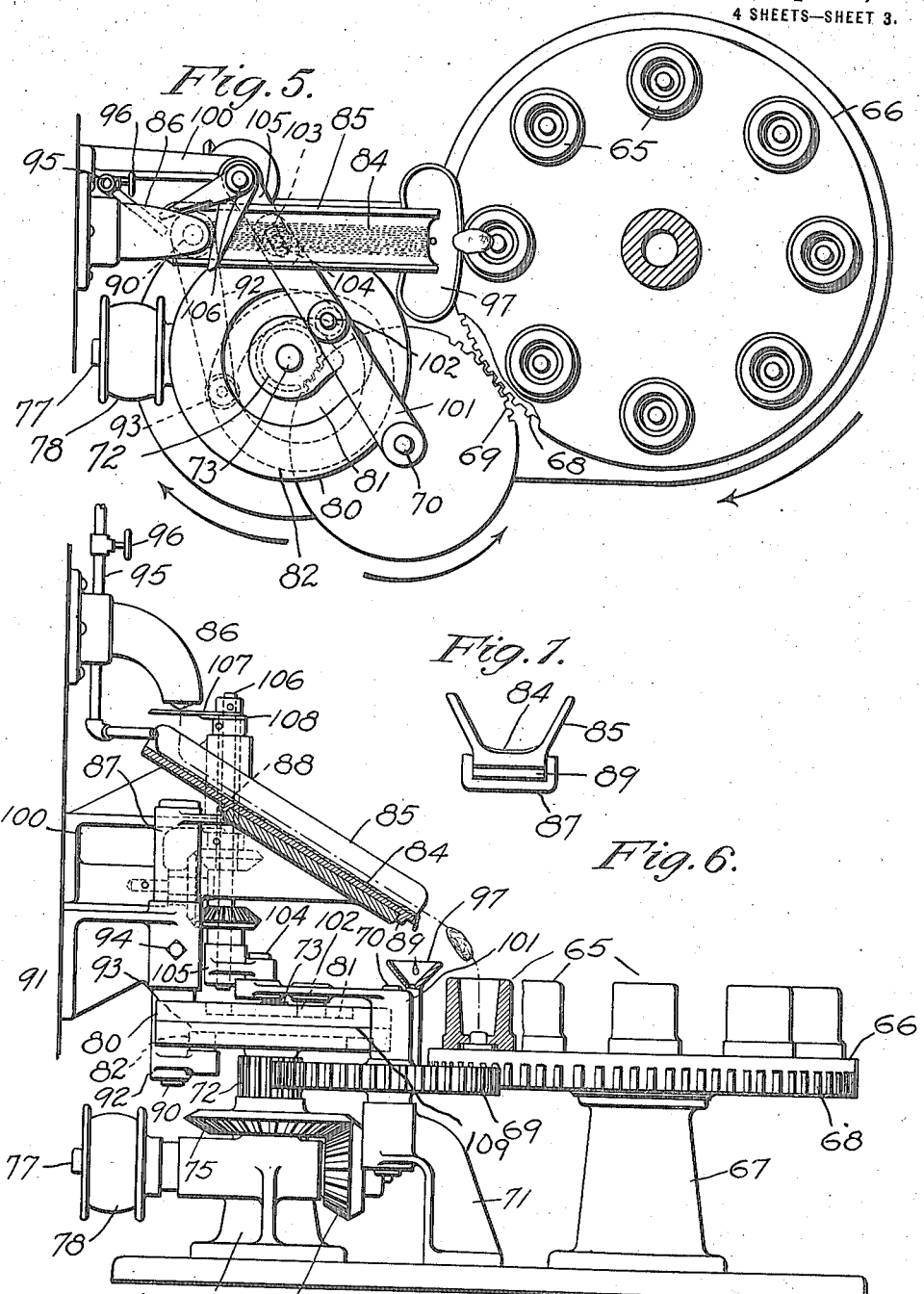

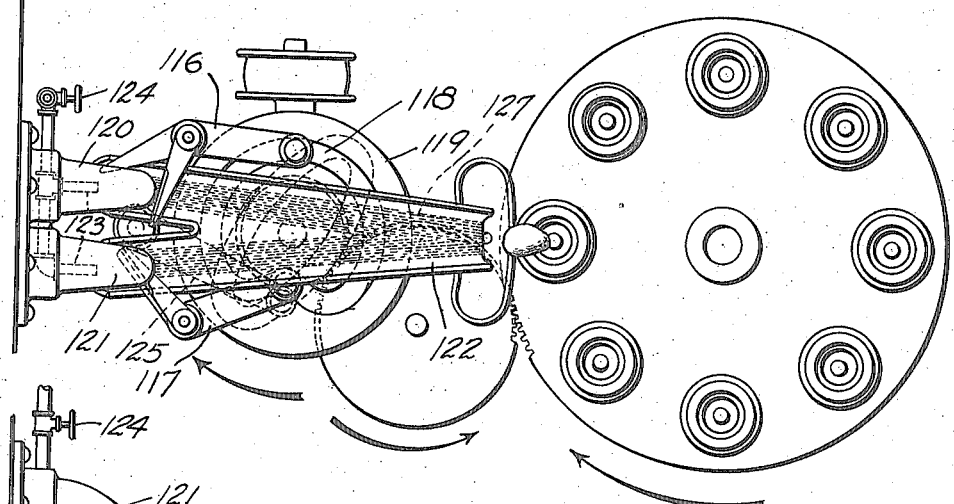
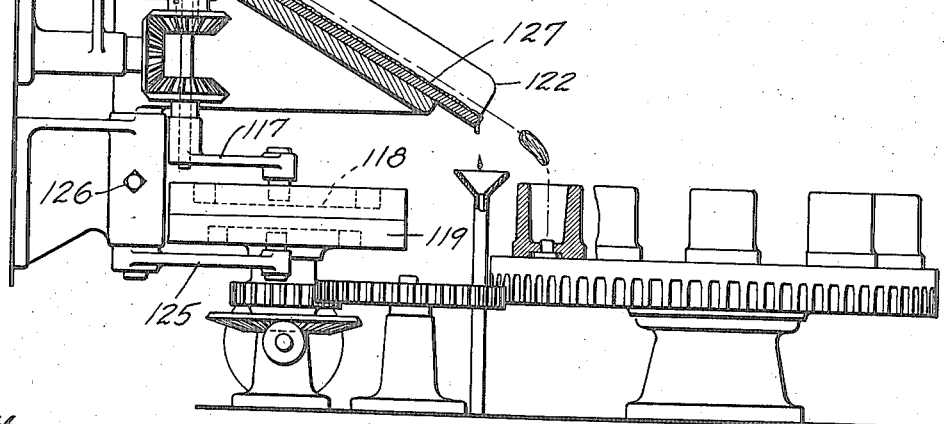

UNITED STATES PATENT OFFICE.

KARL E. PEILER, OF HARTFORD, CONNECTICUT, ASSIGNOR TO HARTFORD-FAIRMONT COMPANY, OF CANAJOHARIE, NEW YORK, A CORPORATION OF NEW YORK.

APPARATUS FOR CONVEYING MOLTEN GLASS.

1,264,328.  Specification of Letters Patent.  Patented Apr. 30, 1918.

Application filed June 24, 1912, Serial No. 705,524. Renewed January 3, 1916. Serial No. 70,078.

*To all whom it may concern:*

Be it known that I, KARL E. PEILER, a citizen of the United States, residing at Hartford, in the county of Hartford and State of Connecticut, have invented new and useful Improvements in Apparatus for Conveying Molten Glass, of which the following is a specification.

This invention is an improved apparatus for feeding or conveying molten glass from a furnace, melting chamber, crucible, pot, or other source of supply or container of molten glass, to molds, or other receptacles, pressing or blowing apparatus, or other means employed for shaping glass into commercial or usable form.

On account of the inherent viscosity, and other peculiar properties of molten glass, it is difficult to handle and convey it rapidly and uniformly by the methods, processes and implements to which other molten substances are amenable. It flows and rolls slowly, is rapidly chilled and easily scarred by contact with gathering tools and other handling and transporting implements. If these are heated enough to prevent this chilling action, then the molten glass is liable to adhere to the heated surfaces, clogging and interfering with their proper action. Undue and especially unequal chilling of the glass also affects its plasticity, making it more difficult to shape, and causes scars in the finished product. Moreover, the pulling away of the molten glass from a surface to which it adheres causes the formation of glass threads and slivers, which are liable to injure the shaping molds or other implements, and are also liable to become embedded in the ware being produced.

Besides the importance of thus feeding and conveying the molten glass without chilling or scarring of its surface, and without having it adhere to the conveying surfaces, it is of great importance to transfer or transport it rapidly and uniformly as to time and quantity, from its melting to its shaping instrumentalities, so as to reduce to a uniform minimum the time of transit, thus establishing a uniform minimum loss of heat by radiation in the air, as well as avoiding the chilling and scarring effect of mechanical contact with the surfaces of the conveying medium. This rapid and uniform delivery of the molten glass enables the shaping implements to act upon the glass while it is as nearly as possible in the uniformly plastic condition in which it leaves the melting pot or furnace. It is moreover generally desirable to have the ess, or blowing machine, or other shaping instrumentality a comfortable distance away from the intense heat of the melting pot or furnace, which further increases the difficulty of conveying the molten glass rapidly and without allowing it to become unduly or unevenly chilled or scarred in transit.

In feeding the molten glass in detached masses or separate "gathers" to a pressing or blowing machine, it is furthermore necessary to deliver the successive masses or "gathers" in register with the successive molds or other shaping implements and in synchronism with the operations of the machine which in some instances carries the molds or other receptacles in continuous movement.

The object of the present invention is to provide a simple, inexpensive, easily controlled and effective apparatus for thus conveying glass in a molten state either in a stream or in separated masses smoothly, uniformly and rapidly to a pot or transfer cup, or directly to the molds or other shaping implements of a pressing or blowing machine, or other apparatus used for shaping or otherwise operating upon the molten glass, and to do this without impairing the quality or the shaping properties of the glass by chilling or scarring, or otherwise, and without allowing the glass to adhere to the conduit or other conveyer employed.

Broadly speaking, the invention consists in an apparatus containing a conduit or runway through which the glass is conveyed and directed from a suitable outlet of the pot or furnace to a mold or other shaping implement, the glass conveying surface of the conduit being provided with and protected and insulated by a fluid film or coating, upon and along which the molten glass, whether in separated masses or in a stream, slides or glides smoothly, freely and swiftly, and is thus projected rapidly and uniformly as to time from the outlet to the mold or other receiving or shaping implement, while the glass remains in the right condition for effecting the best results, and for uniformly producing perfect articles of glassware.

The accompanying drawings illustrate different embodiments of this invention, showing it adapted to different representative conditions. In these embodiments the glass is illustrated as being fed in separated masses, although it may obviously be employed for the feeding of a continuous, or a less interrupted stream, according to the quantity of glass to be delivered in a given time or to a particular mold or receptacle.

Figure 2:
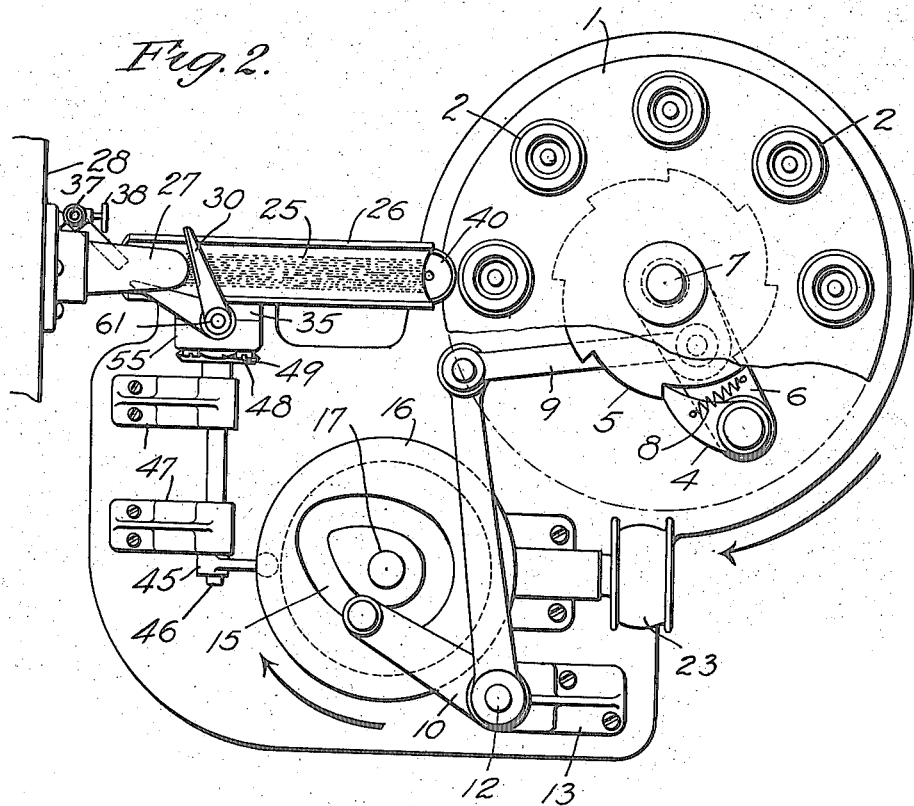

Figure 1 is a side elevation and Fig. 2 is a plan view of an embodiment of the invention in which the glass is shown to be conveyed from the outlet of a tank or furnace to a succession of molds on an intermittently rotating table of a pressing machine. In this instance the glass is delivered through a stationary conduit to the molds while they are stationary during the intermission in the rotations of the table. Fig. 3 is a sectional end view of the conduit of Figs. 1 and 2 in section taken on the line 3—3 of Fig. 1. Fig. 4 is a side elevation in section taken on the line 4—4 of Fig. 1, showing the details of the shear mechanism. Fig. 5 is a plan view and Fig. 6 a side elevation of an embodiment of this invention, in which the molten glass is conveyed and delivered to a succession of molds on a continuously rotating press table, the conduit being in this instance mounted for swinging movement, and its delivery end being moved in suitable register with the successive molds during the delivery of the glass. Fig. 7 is an end view of the conduit shown in Figs. 5 and 6. Fig. 8 is a plan view and Fig. 9 a side elevation of an embodiment of the invention adapted for the conveying of glass from a plurality of outlet spouts from which the glass is alternately conveyed and delivered to a succession of continuously revolving molds on a rotating press table.

In the embodiment shown in Figs. 1 to 4 inclusive, the press table 1 carrying the molds 2 is mounted for rotation upon a suitable frame or base 3, the table being advanced intermittently by means of a pawl 4 engaging with a ratchet wheel 5 appurtenant to the under side of the table. The pawl is pivotally mounted upon an arm 6 journaled at 7 concentrically with the ratchet wheel and table, a spring 8 being employed to draw the pawl into the notches of the ratchet. Oscillating movement is imparted to the pawl arm 6 by means of a rod 9 connected to one arm of a bell-crank 10 which is mounted upon the stud 12 supported by the bracket 13, another arm of the bell-crank being provided with a roll or pin 14 engaging with the cam groove 15 in the cam 16 mounted upon the vertical shaft 17, the lower end of which is suitably journaled and supported in a bracket 18, and is driven by bevel gears 19 and 20 from a driving shaft 22, which may be connected with any suitable motor, as for example by means of a pulley 23.

The cam groove 15 is shaped and adapted to advance the table by successive rotative steps at each rotation of the cam, each step serving to bring the next mold to its desired stopping position at or under the end of the conduit, from which it receives its "charge" or "gather" of glass, as illustrated in Fig. 1.

The conduit 26 is supported in an inclined position, with its higher end beneath the outlet 27 of the furnace 28, or other source of supply from which the molten glass is here shown to be delivered in detached masses, in the form of globules 29, which after being cut off by the shears 30 fall upon the conduit 26 and slide by gravity down and along the conduit from which they are projected into the adjacent mold 2 along a trajectory represented by the line 32, which extends beyond the conduit, so that each globule or charge of glass is delivered as nearly as possible into the center of its mold. In this instance, the effect of gravity is utilized for moving the glass along the vapor film surface of the inclined conduit. Obviously, however, in this, as in the other modifications shown, the glass may be delivered to and projected along a more nearly level conduit by some other propulsive force than that of gravity.

The conduit 26 is herein shown as being made in the form of a trough supported by a bracket 35 extending from the furnace or from any convenient post or column. For ready removal and replacement of the conduit, it is herein shown as a separate piece, resting by its own weight upon the bracket 35, ribs or studs 36 entering corresponding grooves or recesses in the bracket as shown in Figs. 1 and 3 to support the conduit in its desired endwise position. The water or other liquid employed for producing a fluid film upon the glass conveying surface of the conduit is herein shown to be supplied to the conduit from a pipe 37, the flow being regulated by a suitable valve 38. The water falling from the end of the pipe flows along the surface of the conduit to its lower end. Any surplus water reaching the end of the conduit without being evaporated falls in drops or in a stream indicated at 39 into a suitable funnel or catch basin 40 from which the water may be drained away from the machine or returned to its original source, to be used over again.

Various liquids which vaporize at a temperature lower than that of the molten glass may be employed, as for example water, various oils and greases, or hydrocarbons. The fluid may be supplied to the conduit either intermittently or continuously by spraying or flowing the liquid upon or along its glass conveying surface in other ways than are herein shown. The conduit, or the lining thereof may be made of metal, stone, wood or other substantially non-porous or impervious material. Or the film may be produced by allowing the liquid to percolate or filter or seep through the pores of a pervious material employed for the conduit or its lining, which in this case may be made of Portland cement, unglazed porcelain or terracotta, along and through which the water or other liquid may flow, distribute and percolate in sufficient quantity so that the evaporation thereof shall produce and maintain at the glass conveying surface of the conduit a suitable and sufficient fluid film, upon and along which the molten glass is supported and conveyed.

The heat of the molten glass vaporizes a sufficient quantity of the water or other liquid to produce a film having the density and other characteristics required for forming the desired separating, insulating and lubricating film between the molten glass and the surface of the conveyer, upon and along which the molten glass slides or glides smoothly and swiftly from the melting tank or furnace to the shaping instrumentalities.

The vaporizing effect of the heat of the molten glass may be modified somewhat by the radiation or convection of heat from the furnace or tank, depending upon the proximity of the furnace, and the character of its walls, or the presence or lack of insulation. These, and other modifying conditions which may exist should be taken into account in adapting this invention to various conditions of use. If the conduit is liable to be overheated by these or other causes, as for example, by the rapid feeding of large quantities of glass, its heat may be regulated by suitably modifying the temperature or the quantity of water or other liquid supplied to the conduit. Or the conduit may be provided with a cooling chamber, through which a tempering medium is circulated, either by a supply from the pipe 37, or from an independent supply. In these, and in many other ways, the practice of this invention may be modified to adapt it to various requirements or conditions of use.

The relative position of the outlet and the mold or other receiving or shaping instrumentality should be adapted to the various conditions of service, depending upon the directions in which the glass drops or is expelled from the outlet, and upon the distance through which the glass is to be conveyed. The conduit may be disposed so as to convey the glass along a path of movement which under its momentum, whether acquired by its initial impulse from the outlet, or acquired by gravity, shall propel it through a trajectory 32, which extends beyond the end of the conveying surface of the conduit, so as to deliver the glass centrally into the mold or other receptacle, as shown in Fig. 1. This permits the conveying surface of the conduit to be terminated short of the mold, if desired, for suitable clearance; and also permits any excess of moisture to drop from the end of the conduit down past and clear of the mold, instead of accompanying the glass into the mold or other receptacle.

The conduit may be straight as herein shown, or it may be curved in any way suitable for adapting it to guide and convey the glass with a suitable velocity and through the desired path.

The detached masses of glass represented by the globule 29 are herein shown to be separated from the supply emerging from the outlet 27 by means of shears 30, the blades of which are operated in synchronism with the movements of the mold table by means of a cam groove 44 upon the peripheral surface of the cam 16. A cam arm 45, the end of which engages in the cam groove 44 is fixed to a shaft 46 supported by brackets 47 and carrying upon its opposite end the bevel gear 48 which meshes with the two bevel gears 49 and 50, the former of which is secured to the lower end of a quill 53, which is journaled for rotation in the sleeve 54 which in turn is adjustably clamped to the bracket 35 by means of a cap 55 and screws 56. To the upper end of the quill 53 is secured a collar 57 carrying the lower shear blade 58, the coöperating upper shear blade 59 being attached to the collar 60, which is pinned to the shaft 61 journaled at its upper end in the quill 53 and supported and centered at its lower end by the bracket 62, all as best shown in Fig. 4. The bevel gear 49 for the lower blade and the bevel gear 50 for the upper blade being turned in opposite directions by the bevel gear 48 thus serve under the movement imparted by the cam groove 44 to close and open the shear blades at the proper times for severing the successive globules or masses of glass from the supply. When thus severed, the glass falls upon the film covered surface of the conduit 26 and slides smoothly and rapidly down that surface into the mold which at that time is at rest at the end of the conduit.

The embodiment of this invention shown in Figs. 5, 6 and 7 is adapted for delivering glass in detached masses to a mold or a series of molds, while they are in motion. In the arrangement illustrated in these figures, a series of molds 65 are mounted to revolve with a rotating mold or press table 66 supported upon the base or pedestal 67 and provided with gear or rack teeth 68, which mesh with the teeth of an intermediate gear 69 rotating upon a stud 70 supported by the bracket 71. This idler gear is driven by a pinion 72 upon a vertical driving shaft 73 journaled in the bracket 74 and having fixed upon it a bevel gear 75 meshing with the bevel pinion 76 on a shaft 77, which may be driven in any convenient way by a motor or from any available source of power, as for example by a belt upon the pulley 78. The upper end of the driving shaft 73 carries a cam 80 having a cam groove 81 in its upper surface for operating the shears, and another cam path 82 in its lower face for swinging the conduit to carry it in alinement or register with each of the successive molds while the glass is being delivered to that mold.

The conduit 85 of which an end view appears in Fig. 7 is here shown to be of the same general form as the conduit 26 of Fig. 3, although it may obviously be of any desired size or form, either an open trough as here shown, or may be tubular or otherwise closed at the top, excepting at its upper end where it is open to receive the glass from the outlet 86. The conduit is supported upon a bracket 87 and may rest loosely thereon for easy removal and replacement, being in this instance doweled by means of cross ribs 88 and 89. The bracket 87 is mounted for swinging movement upon a shaft 90 journaled in the bracket 91 approximately beneath the outlet 86 so that the axis of oscillation of the bracket and its conduit maintain the glass receiving portion of the conduit beneath the outlet. The lower end of the shaft 90 is provided with a cam arm 92 having a pin or stud 93 working in the cam groove 82 in the under face of the cam 80, the path of the cam groove being so shaped as to impart the desired oscillatory movements to the conduit 85, carrying its delivering end in proper register or alinement with each of the successive molds during the operation of delivering glass thereto.

The liquid for producing or maintaining the vapor film on the glass conveying surface of the conduit is or may be supplied from a pipe 95 having a valve 96 for regulating and controlling the supply of liquid. Any surplus liquid which may reach the lower end of the conduit without being evaporated falls into a catch basin 97. This arrangement for the liquid supply and for the disposal of the drip is like that shown in the previous figures excepting that the catch basin 97 is in this instance elongated beneath the path of the swinging delivery end of the conduit so as to receive the surplus liquid that may fall at any portion of that swinging movement.

The shear mechanism, which in construction and arrangement is otherwise similar to that shown in the previous figures already described, is supported upon the bracket 100, and is driven by a cam arm 101, which swings upon the upper end of the stud 70, and is provided with a pin or roller 102 working in the cam groove 81. The end of the cam arm is slotted at 103 to receive a pin 104 appurtenant to the arm 105, by means of which turning movement is imparted to the shear shaft 106 and to the upper blade 107, and to the lower blade 108 by the bevel gear mechanism shown, which is similar to that described in connection with the previous figures.

The cam 80 for operating the shear and for swinging the conduit are so geared relative to the table as to operate once for each of the molds carried past the end of the conduit by the rotating table 66. For convenience in timing and adjusting the parts, the cam 80 is preferably made in two parts, as indicated by the line 109, the two parts being clamped or doweled together, when adjusted, in any convenient way. Considerable latitude in the time of delivery of the glass is provided for by thus swinging the delivery end of the conduit in register with each mold during a considerable period, thereby allowing for possible variations in the time of cutting off, in the rapidity of travel down the conduit, and in the length of the charge or gather. Moreover, this sidewise swinging movement of the end of the conduit imparts to the charge or gather of glass a sidewise movement in the direction of revolution of the mold. Thus the trajectory described by the charge is curved sidewise as well as downwardly, and it is thereby carried along with the mold while falling into the mold. This enables the charge to be delivered into the bottom of the mold without striking against the sides thereof. The importance of this provision increases with the depth of the mold, and also with the length of the charge or gather, which may some times or for some purposes be delivered in a short compact mass, and at other times may be more or less elongated.

The machine being put into operation and the supply of water or other liquid turned on, the molten glass exuding from the end of the outlet 86 and generally forming into drops or globules, as illustrated in Fig. 1, is severed by shears and falls upon the moistened surface of the inclined conduit down which it slides toward the mold with which the end of the conduit is at that time being carried along in alinement, the heat of the glass generating the protecting and lubricating film surface along its course. Having thus supplied that particular mold the conduit swings backwardly to meet the next mold, with which it travels in alinement while the next globule or "charge" of glass is being delivered thereto, and so on.

The embodiment of this invention illustrated in Figs. 8 and 9 is adapted to feed the molten glass alternately from two different outlets of the glass furnace to a series of revolving molds carried on a rotating table. The construction, arrangement and mode of operation of the mold table and the mechanism for operating the shears and swinging the conduit in suitable time relation to the rotating table, are substantially like those shown in Figs. 5, 6 and 7, already described, excepting that the shear mechanism is duplicated for the additional outlet, the two mechanisms being operated alternately by their respective cam arms 116 and 117 engaging with the same cam path 118 in the upper face of the cam 119. The upper end of the conduit 122 is made wide enough to underlie the two outlets 120 and 121, or is forked as shown in Fig. 8 to provide a branch conduit for each outlet. The water or other vaporizing fluid is supplied to the respective branches by means of the two branch pipes 123, through which the control may be regulated by a single valve 124 or by separate valves, if found necessary.

Obviously, the two modifications shown in Figs. 5 to 9 inclusive which are herein shown as being adapted for delivering the glass to moving molds may equally well be employed for delivering glass to stationary molds, or during the stationary periods in molds which are moved intermittently as shown in Figs. 1 and 2, merely by removing or disconnecting the cam arm 92 in the machine illustrated in Figs. 5 and 6, or the cam arm 125 in the machine illustrated in Figs. 8 and 9, and then clamping the respective conduits in a suitable fixed position upon their supporting brackets as by means of a set screw 94 or 126, thereby adapting either of these machines to feed glass to the stationary mold of a single press or the revolving molds of an intermittently operated multiple press, or the constantly revolving molds of a rotary multiple press. In many other ways which will suggest themselves to those skilled in this art, this invention may be modified for adapting it to various uses or conditions of service.

I claim as my invention:—

1. In apparatus for conveying molten glass, a conduit extending in a generally horizontal direction and having a fluid film spread in a free state on its surface.

2. In apparatus for conveying molten glass, the combination of an inclined conduit, and means for flowing a lubricating film of fluid along the surface of the conduit from a higher to a lower level.

3. The combination, in conveying apparatus for molten glass, of an inclined conduit and means for supplying liquid to the higher end of the conduit whereby the liquid flows along the inclined glass conveying surface of the conduit.

4. The combination, in apparatus for conveying molten glass, of a conduit, means for feeding the molten glass to the conduit, and means for flowing a liquid film along the surface of the conduit independently of the movement of the glass.

5. In apparatus for conveying molten glass, the combination of an inclined conduit, means for flowing a lubricating film of fluid along the surface of the conduit, and means for collecting and leading away excess fluid that may reach the end of the conduit.

6. In apparatus for conveying molten glass to a shaping mold, the combination of an inclined conduit, extending toward but stopping short of the mold, means for flowing a lubricating film of fluid along the surface of the conduit, and means for collecting and leading away whatever excess of the fluid may reach the end of the conduit, whereby the glass conveyed by the conduit is projected beyond the end of the conduit and freed from any appreciable amount of accompanying fluid.

7. The combination, of a glass furnace outlet, a mold, an inclined conduit extending from beneath the outlet toward but not to the mold, and means for producing a fluid film along the glass conveying surface of the conduit whereby the momentum of the glass sliding down the inclined fluid covered surface of the conduit carries it beyond the conduit in a trajectory entering the mold.

8. In apparatus for feeding molten glass to a traveling mold from a source of supply disposed in proximity to the path of travel of the mold, the combination of a conduit mounted for swinging movement about a center adjacent to the said source of supply, with its delivery end extending toward and in transverse relation to the said path of travel of the mold, and means for swinging the delivery end of the conduit laterally to maintain it in delivering alinement with said mold while feeding glass thereto.

9. The combination, in apparatus for delivering molten glass to a moving receptacle, of a glass conveying conduit, means for swinging the delivery end of the conduit laterally to carry it with the moving receptacle, and means for flowing volatile liquid along the glass conveying surface of the conduit.

10. The combination, in apparatus for delivering molten glass to a moving receptacle, of means for feeding detached masses of glass, a conduit having one end pivotally supported adjacent to the feeding means, means for supplying the glass conveying surface of the conduit with a fluid film, and means for swinging the delivery end of the conduit upon its pivotal support in approximate registry with the moving receptacle during the delivery period.

11. The combination, in apparatus for delivering molten glass from a stationary outlet to a movable receptacle, of an inclined conduit mounted for swinging movement on an axis adjacent to the outlet, means for flowing a fluid film down the glass conveying surface of the conduit, and means for swinging the conduit to maintain it in delivering alinement with the moving receptacle during the delivering operation.

12. The combination, in apparatus for delivering molten glass from a stationary outlet to a moving receptacle, of an inclined conduit mounted for swinging movement on an axis permanently adjacent to the stationary outlet, means for flowing a fluid film along the glass conveying surface of the conduit, means for severing detached masses of glass from the outlet, and dropping them upon the fluid film and means for swinging the delivery end of the conduit in delivering registry with the moving receptacle during the delivering operation and in timed relation with the severing means.

13. The combination, in apparatus for delivering molten glass from the outlet of a glass furnace to a moving receptacle, of an inclined conduit mounted upon an axis permanently adjacent to the said outlet, means for flowing a supply of liquid along the glass conveying surface of the conduit, means for swinging the delivery end of the conduit in delivering alinement with the moving receptacle during the delivering operation, and shear mechanism for severing detached masses of glass and dropping them upon the liquid covered surface of the conduit in timed relation with the swinging means and with the moving receptacle.

14. The combination, in apparatus for conveying molten glass, of a furnace outlet, an inclined conduit supported for swinging movement upon a center permanently located approximately beneath the outlet, means for supplying liquid to the glass conveying surface of the conduit, molds carried by a rotary mold table, and means for swinging the delivery end of the conduit in approximate alinement with each of the successive molds to deliver the glass to the said molds while revolving with the rotary table.

15. The combination, with a series of revolving molds, of means for delivering the molten glass to the molds from a furnace outlet, including an inclined conduit mounted for swinging movement upon a center permanently located approximately beneath the outlet, means for supplying liquid to the glass conveying surface of the conduit, and means for swinging the delivery end of the conduit in delivering registry with each of the successive revolving molds while delivering the glass thereto.

16. The combination of revolving molds, a furnace outlet, located in proximity to the path of revolution of the molds, a conduit pivotally mounted adjacent to the outlet, with its delivery end extending toward the said path of revolution, and means for swinging the delivery end of the conduit to carry it in delivering alinement with each revolving mold, while delivering the glass to that mold, and then swinging the end of the conduit back into similar alinement with the succeeding mold.

17. The combination of a series of revolving molds, a glass furnace outlet located outside of the path of revolution of the molds, a conduit pivotally mounted beneath the outlet with its delivery end extending toward the said path of revolution, means for oscillating the conduit upon its pivotal support to carry its delivery end forward in delivering registry with each mold and backward into similar registry with the succeeding mold.

18. The combination, with a series of moving receptacles for glass, of a source of supply of molten glass located at one side of the path of movement of the receptacles, an inclined conduit extending from beneath the source of supply toward the path of movement of the receptacles, and having its glass conveying surface provided with a gravity flow of liquid, shear mechanism for severing the supply of glass in detached masses and dropping them upon the conduit, and mechanism for moving the receptacles and connecting the shear mechanism to operate in suitable time relation to each other.

19. The combination, with a series of revolving molds, of a supply outlet for molten glass, an inclined conduit extending from beneath the supply outlet toward the path of revolution of the molds and having a glass conveying surface provided with a protecting gravity flow of fluid, means for severing the glass from the outlet and dropping it in detached masses upon the conduit, and mechanism for revolving the molds and operating the severing means in suitable time relation to each other.

20. The combination, with a series of revolving molds, of a supply outlet for molten glass located at one side of the path of revolution of the molds, means for severing the glass delivered from the outlet, a conduit mounted for oscillating movement upon a center adjacent to the point at which it receives the glass from the outlet and extending therefrom toward the path of revolution of the molds, and connecting mechanism for revolving the molds, operating the severing means, and oscillating the conduit in suitable time relation to each other.

21. The combination, with a series of revolving molds, of a supply outlet for molten glass located at one side of and above the path of revolution of the molds, a conduit mounted for oscillating movement about a center adjacent to the point at which it receives the glass from the outlet, and inclined downwardly therefrom toward the path of revolution of the molds, but stopping short of the molds, means for producing a gravity flow of liquid upon the glass conveying surface of the conduit, and means for catching and leading away whatever excess of liquid may reach the delivery end of the conduit, whereby the glass sliding down the conduit is projected beyond the end of the conduit into its mold, freed from any appreciable amount of accompanying liquid.

22. In a glass machine, a plurality of receiving receptacles continuously movable in a closed path, and means for discharging molten glass into said receptacles in successive order, said means moving with each receptacle during a predetermined portion of its movement and then returning to an initial position and coacting with the next following receptacle.

23. In a glass machine, a plurality of receiving receptacles movable uninterruptedly and continuously in a closed path, and means for distributing glass into each of these receptacles successively, said means including a member movable from an initial glass receiving position with each of said receiving receptacles successively and for a predetermined extent of movement of the latter and after said coincident movement returning to an initial position and coacting with the next successive receiving receptacle.

In testimony whereof I have signed my name to this specification in the presence of two subscribing witnesses this 22 day of June, 1912.

KARL E. PEILER.

Witnesses:
WILLIAM A. LORENZ,
E. R. ABBOTT.